United States Patent

[11] 3,603,091

[72] Inventor  Bernhardt Stahmer
               1509 Chicago Street, Omaha, Nebr. 68102
[21] Appl. No. 836,904
[22] Filed     June 26, 1969
[45] Patented  Sept. 7, 1971

[54] INTERNAL COMBUSTION ENGINE
     2 Claims, 7 Drawing Figs.
[52] U.S. Cl. ................................................ 60/247,
                                                60/39.76, 115/13
[51] Int. Cl. ................................................ F02k 7/06,
                                                             B63h 11/14
[50] Field of Search ........................................ 60/247,
                                                39.76; 115/13, 12 A

[56]              References Cited
            UNITED STATES PATENTS
   916,726  3/1909  Lake ............................ 60/247
 1,074,635 10/1913  Marcotte ...................... 60/39.76
 1,310,459  7/1919  Walkos ........................ 60/39.76
 2,277,226  3/1942  Hansen ........................ 60/39.76
 2,512,254  6/1950  Mallory ....................... 60/247
 2,623,355 12/1952  Boulet ......................... 60/39.76
 2,670,011  2/1954  Bertin ......................... 60/13
 2,807,136  9/1957  Foster ......................... 60/247
 3,112,613 12/1963  Nelson ........................ 60/247

Primary Examiner—Douglas Hart
Attorney—George R. Nimmer

ABSTRACT: An internal combustion engine wherein successive finite gravimetric quantities of a gaseous thermally explodable medium are at periods of a given time interval compressed by a compression means through the closeable entrance port of a fixed partition wall into a constant volume explosion chamber where each successive gravimetric quantity is exploded in complete isolation from the compression means, substantially all the resultant gaseous combustion product being exhausted intermittently pulsewise from the explosion chamber through an exhaust channel leading away from the compression means and the fixed partition wall. The exhaust channel, downstream from the explosion chamber, has means to convert the intermittent pulse wise exhaust into useful work, including novel motive power for marine craft.

(FUEL INTAKE COMPLETE)

PATENTED SEP 7 1971
3,603,091
SHEET 1 OF 5
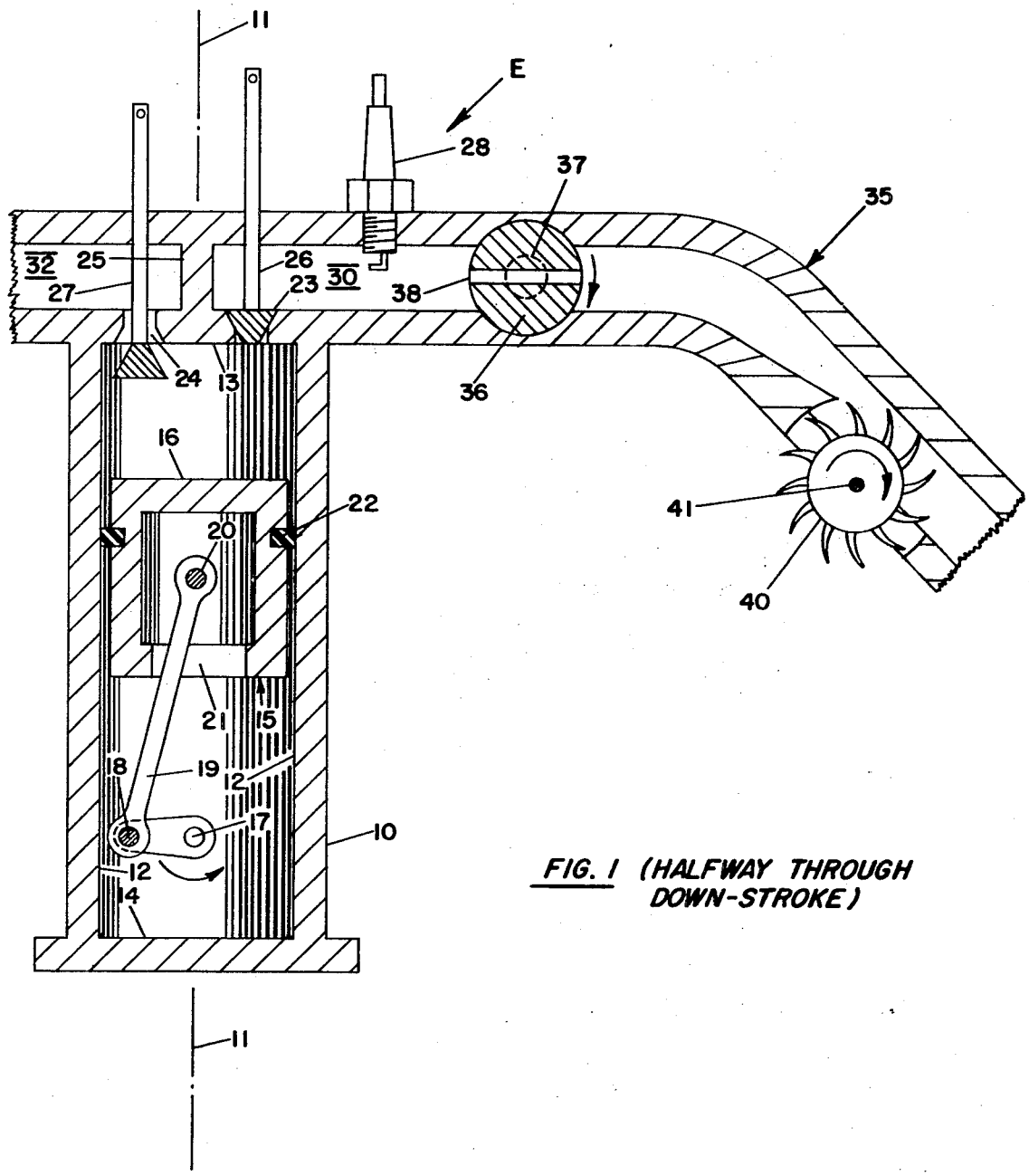
FIG. 1 (HALFWAY THROUGH DOWN-STROKE)
BERNHARDT STAHMER
INVENTOR.
BY George R Rimmer
ATTORNEY

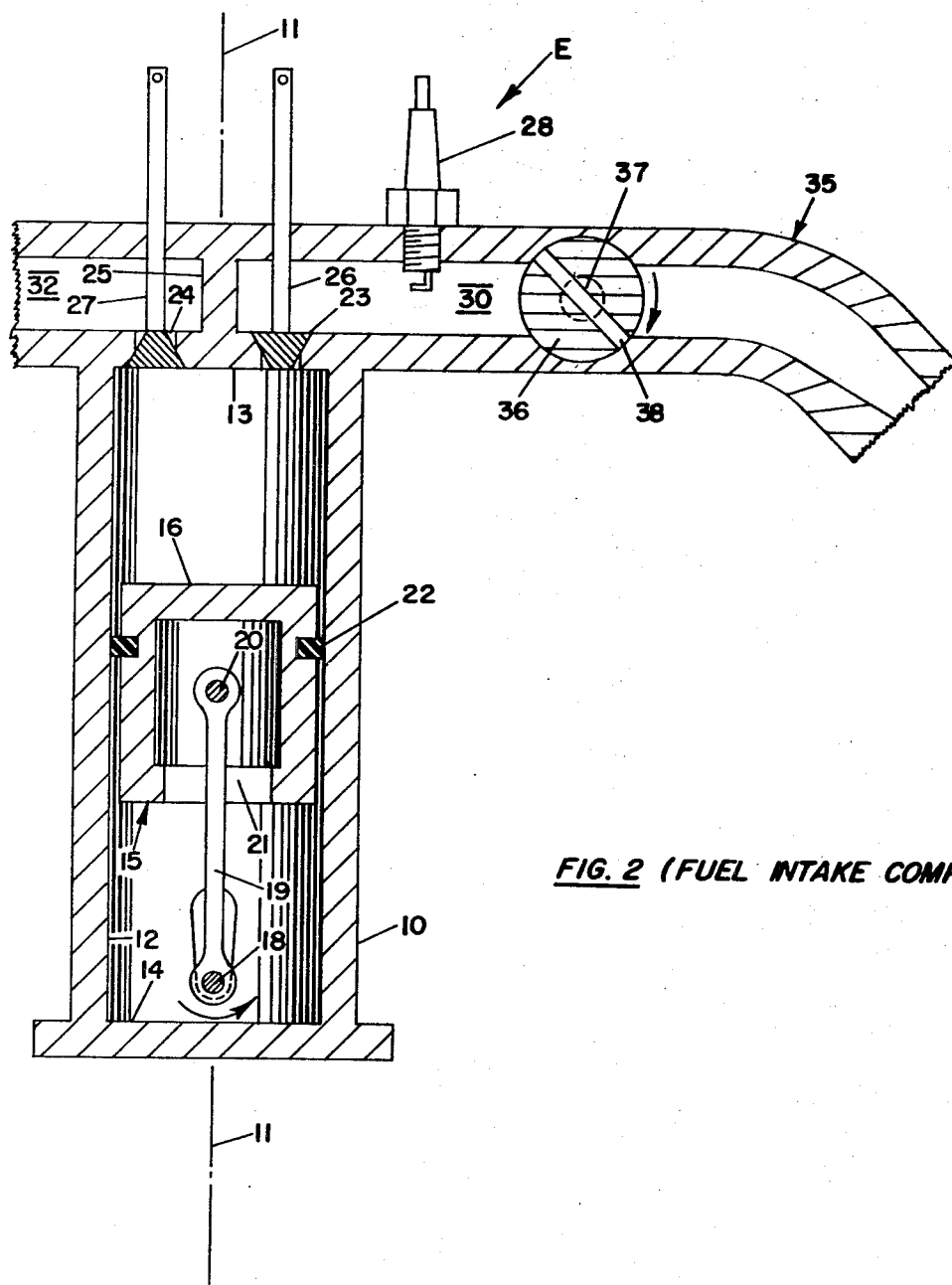
FIG. 2 (FUEL INTAKE COMPLETE)

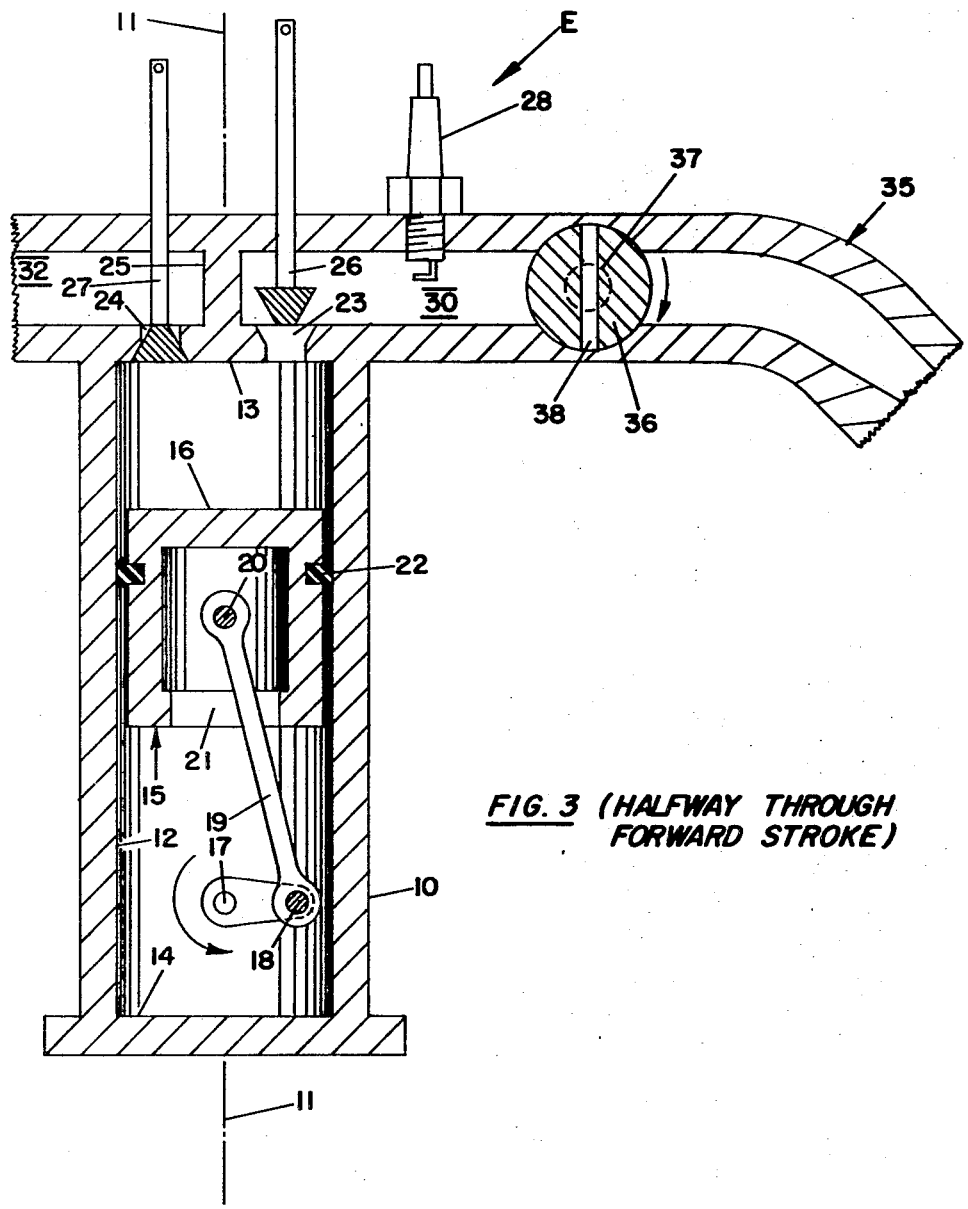
FIG. 3 (HALFWAY THROUGH FORWARD STROKE)
BERNHARDT STAHMER
INVENTOR.
BY George R. Nimmer
ATTORNEY

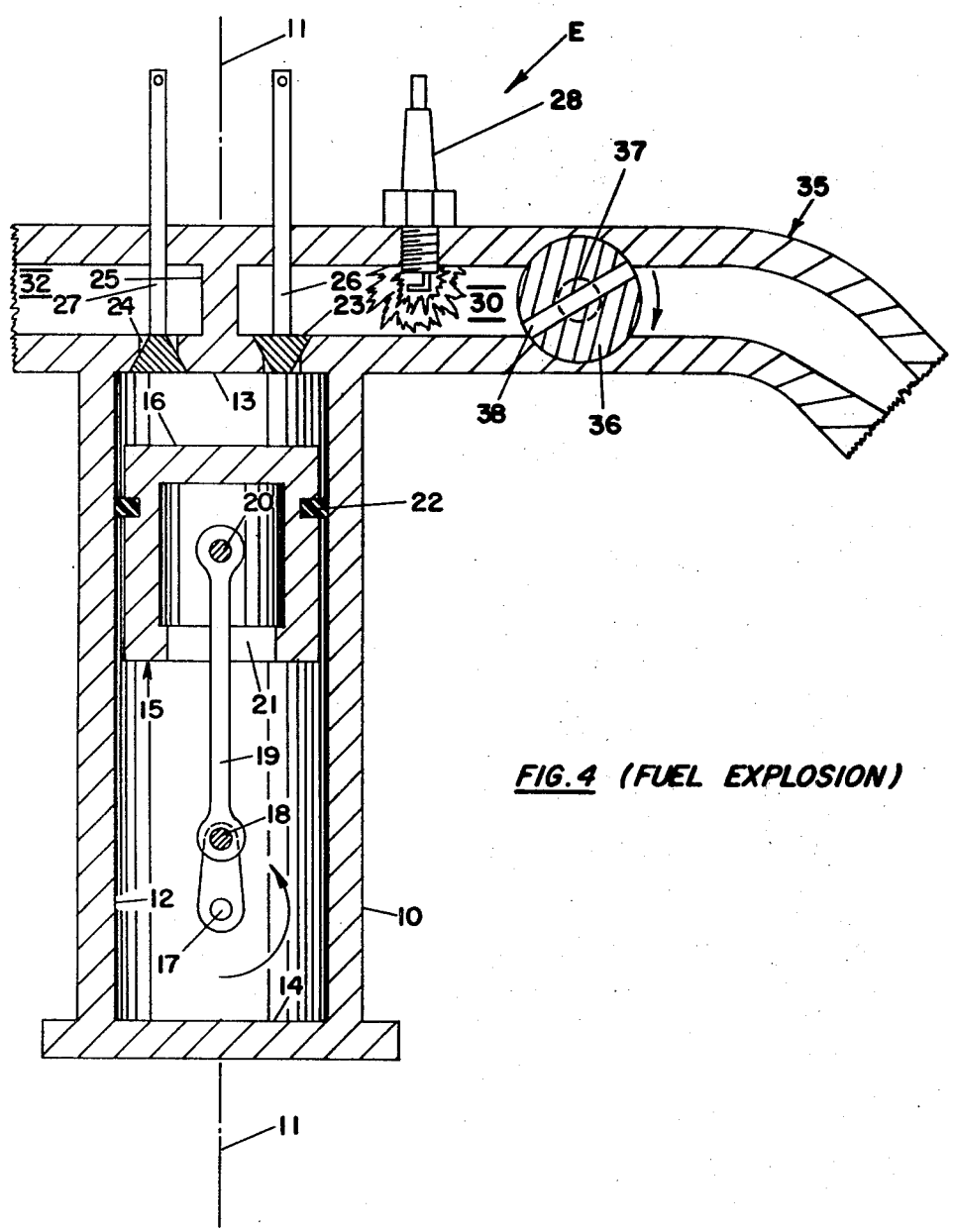
FIG.4 (FUEL EXPLOSION)

BERNHARDT STAHMER
INVENTOR.

BY George R. Nimmer
ATTORNEY

INTERNAL COMBUSTION ENGINE

Internal combustion engines traditionally comprise a lubricated compression means, such as a reciprocating piston or as a rotating vaned or lobed wheel, that compresses successive periodic batches a finite given gravimetric quantity of a gaseous combustible medium e.g., a mixture of air and vaporized hydrocarbon, into a rigorously confined space which is at least partially bounded by the compression means. The compressibly confined given gravimetric quantity or finite batch of the gaseous combustible medium is then thermally (as by a spark plug or by high compression ratios in diesel engines) explodably expanded directly against the compression means whereby the explosive force of the gaseous combustion products is transmitted directly against the compression means and from there to an external work load. When the compressed gaseous medium is exploded directly against the compression means the following difficulties are apt to exist: first, there is the necessity for expensive purge means to purge the environs of the compression means from the gaseous and solid combustion products, said purge means causing loss of engine efficiency; second, there is chemical degradation and/or vaporization of compression means lubricant such that the compression means becomes fouled and the exhaust gases contain pollutants for the atmosphere; third, there is the necessity for expensive and elaborate cooling means to cool the compression means, said cooling means causing loss of engine efficiency; and fourth, there are difficulties in providing efficiently homogeneous mixtures of the combustible hydrocarbons with air. Moreover, about 30 percent of the engine input energy is commonly lost in the form of exhaust gases.

It is, accordingly, the general object of the present invention to overcome the several disadvantages and difficulties associated with prior art internal combustion engines wherein the gaseous explosive force is transmitted directly against the compression means.

It is a specific object of the present invention to provide an internal combustion engine having a compression means that is protected from the combustible explosions of the compressed gaseous fuel whereby there is minimal fouling and contamination of the compression means.

It is another object of the present invention to provide an internal combustion engine that is of economical simplified construction and of unusual efficiency as afforded in part by the practical elimination of elaborate cooling requirements and exhaust gas purging means at the compression means, and by the purposeful harnessing of substantially all the exhaust gases to do useful work.

It is a further object to provide an internal combustion engine wherein chemical degradation and vaporization of the compression means lubricant is practically eliminated so that the exhaust gases are relatively clean and are not apt to pollute the earth's atmosphere.

It is yet another object to provide an unusually efficient two-stroke cycle reciprocating piston compression means internal combustion engine embodiment in accordance with the foregoing objects.

It is a further object to provide an internal combustion engine wherein the force of the gaseous explosion products are expended, not against the compression means to do useful work, but along a remotely positioned exhaust channel wherein the explosive power is harnessed to do useful work.

It is yet another object to provide a novel internal combustion wherein the explosive exhaust is employed to do work in a pulsewise or intermittent manner along the exhaust channel.

It is a further object to provide a novel exhaust channel for the internal combustion engine of the present invention that is exceedingly well adapted to provide motive power for a marine craft.

With the above and other objects and advantages in view, which will become more apparent as this description proceeds, there is provided herein an internal combustion engine wherein successive finite gravimetric quantities of a gaseous thermally explodable medium are at periods of a given time interval compressed by a compression means through the closeable entrance port of a fixed partition wall into a constant volume explosion chamber where each successive gravimetric quantity is exploded in complete isolation from the compression means, substantially all the resultant gaseous combustion product being exhausted intermittently pulsewise from the explosion chamber through an exhaust channel leading away from the compression means and the fixed partition wall. The exhaust channel, downstream from the explosion chamber, has means to convert the intermittent pulsewise exhaust into useful work, including novel motive power for marine craft.

In the drawing, wherein like characters refer to like parts in the several views, and in which:

FIG. 1 is a somewhat schematic axial cross-sectional view through a reciprocatable piston compression means embodiment of the internal combustion engine of the present invention, said piston being shown at an intermediate stage of the rearward stroke.

FIG. 2 is a schematic view of the reciprocatable piston embodiment of FIG. 1, but with the piston being shown at the rearward extremity of the rearward stroke.

FIG. 3 is a schematic view of the reciprocatable piston embodiment of FIG. 1, but with the piston being shown at an intermediate stage of the forward stroke.

FIG. 4 is a schematic view of the reciprocatable piston embodiment of FIG. 1, but with the piston being shown at the forward extremity of the forward stroke.

Figure 7:
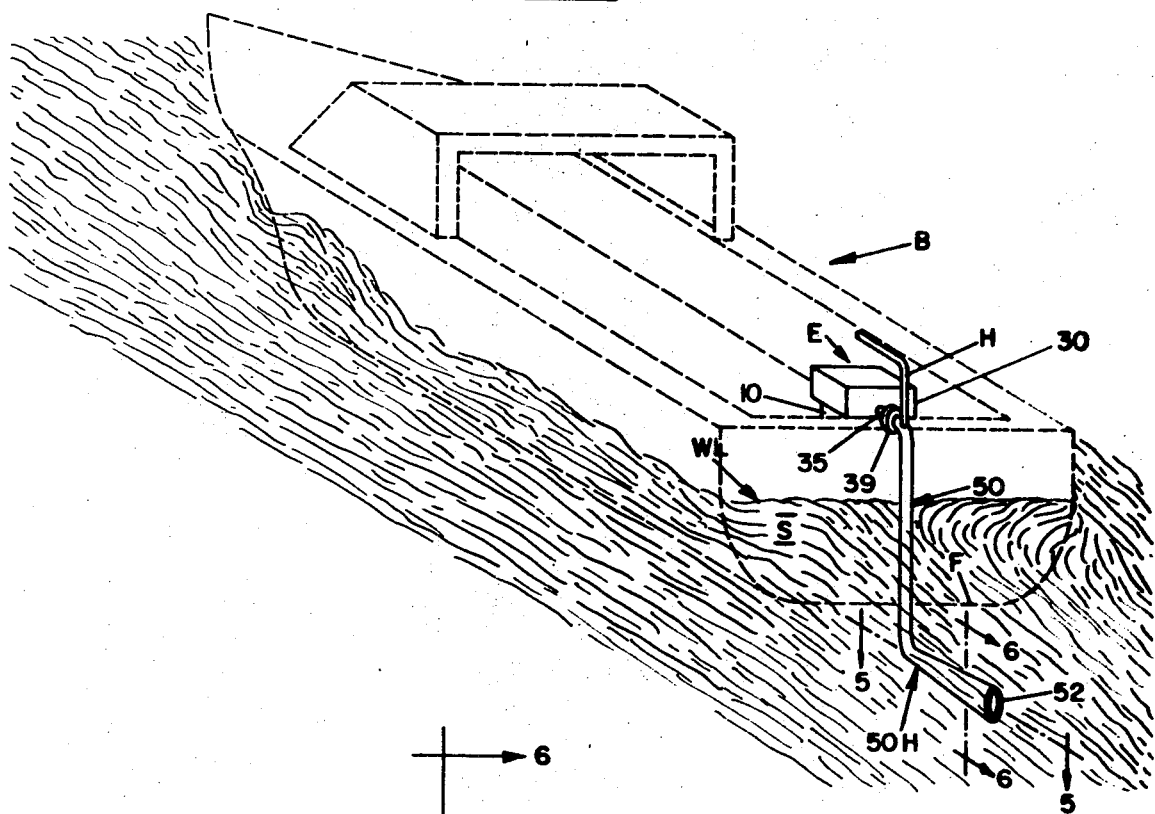
FIG. 7 is a schematic side elevational view of a typical marine craft that is forwardly motivatable by means of the alternate exhaust channel of FIGS. 5 and 6.

The essential compression means portions of the internal combustion engine of the present invention is adapted to intermittently deliver finite batches of a given gravimetric quantity of a compressed gaseous thermally combustibly explodable medium within a given time interval through the entrance port of a partition wall into an explosion chamber. FIGS. 1–4 represent a typical embodiment of the internal combustion engine "E" of the present invention comprising a lubricatable reciprocatable cylindrical piston 15 within tubular cylinder 10 as the essential compression means portion thereof; piston 15 is adapted to introduce successive finite batches of a given gravimetric quantity of a thermally combustibly explodable gaseous fuel medium e.g., a mixture of air and vaporized hydrocarbon, through entrance port 23 of partition wall 13 into constant-volume explosion chamber 30, each successive introduction of fuel into the explosion chamber being spaced at a given time interval.

Elongate tubular cylinder 10 is positioned along a longitudinal reference axis 11, the interior elongate wall 12 of cylinder 10 being circularly concentric about axis 11, said cylinder 10 having a transverse partition wall 13 as the fixed forward end thereof. Hollow cylindrical piston 15, having a transverse forward end 16, is longitudinally slideably reciprocatable along the cylinder interior elongate wall 12 parallel to axis 11, said piston 15 having a forward limit of travel nearer to partition wall 13 (as shown in FIG. 4) and also having a rearward limit of travel more remote from partition wall 13 (as shown in FIG. 2).

There are conventionally selectable means to cause the piston compression means to move in alternate forward and rearward limits of travel, the time period for the forward and rearward piston strokes being substantially equal and together equaling the said given time interval. Herein, said means comprises an independently powered conventional crankshaft passing through cylinder 10 forwardly of cylinder fixed transverse rearward end 14, the crankshaft fixed elevation main portion 17 being revolvably journaled by cylinder 10 and turning at a constant rate of speed; and crankshaft offset portion is herein indicated as 18. An elongate connecting rod 19 has a rearward end revolvably connected to the crankshaft offset portion 18 and has a forward end revolvably connected to a wristpin portion 20 located within the interior hollow piston 15, the connecting rod forward portion passing through an axial opening 21 in the transverse rearward end of hollow cylindrical piston 15. Thus as the crankshaft rotates in the indicated counterclockwise direction about its journaled main portion 17, the crankshaft offset portion 18 revolves at a constant speed about the fixed elevation position 17 to cause the alternate forward and rearward strokes of piston 15, four arbitrarily selected positions of piston 15 being shown in FIGS. 1–4. The elongate external wall of piston 15, which is circularly concentric about axis 11, is herein provided with a sealer-ring portion 22 in slidable contact along cylinder interior wall 12, sealer-ring 11 being concentric about axis 11.

Disposed forwardly of the entrance port 23 of transverse partition wall 13 is an explosion chamber 30 of substantially constant internal volume, said partition wall 13 providing a portion of the fixed volumetric confines of explosion chamber 30. Also, providing a portion, herein at the lateral leftward side, of the explosion chamber fixed internal volume is an upright divider wall 25 integrally attached to partition wall 13 between entrance port 23 and inlet port 24. Explosion chamber 30 is adapted to thermally combustibly explode successive finite gravimetric quantities of a compressed gaseous combustibly explodable medium (such as mixture of air and vaporous hydrocarbon) which have been delivered into the explosion chamber 30 within given time intervals by the compression means through the partition wall entrance port 23; in this regard, there can be an ignition means e.g., as spark plug 28 ignition means, the spark plug 28 being briefly actuated at the said given time interval in substantial synchronization with each closing of entrance port 23, as by its valve 26. In the case of diesel fuels, the ignition means therefore would simply comprise the closure of entrance port 23 at the critical compression ratio of the diesel fuel, auxiliary heat sources e.g., a "hot wire," within chamber 30 being optionally employable to govern the critical explodable compression ratio of the diesel fuel. The volume of explosion chamber 30 is desirably less than the displacement volume of the compression means e.g., forward stroke volume of piston 15.

Explosion chamber 30 necessarily includes an exhaust channel 35 communicating with the explosion chamber interior, said exhaust channel 35 commencing remotely of entrance port 23. There is an exhaust valve 36 disposed along exhaust channel 35, herein at an initial portion of exhaust channel 35. Exhaust valve 36 is adapted to alternately open and close during said given time interval to allow the gaseous combustion products of the exploded compressed gaseous medium from each fuel batch to intermittently travel pulsewise along the exhaust channel while expanding to do work therealong e.g., upon radial vane-type turbine 40, or marine propulsion means 50. Exhaust valve 36 desirably opens upon the explosion of the gaseous medium within explosion chamber 30 and remains closed while the compressed explodable gaseous medium is being introduced into the explosion chamber by the compression means e.g., the forwardly moving piston 15. While several different types of exhaust valves might be employed, including the 26–27 type valve, a conventional rotary-type valve 36 is illustrated in FIGS. 1–4, valve 36 being revolvably attached to exhaust channel 35 with central pin 37 and valve 36 being rotatable in the indicated clockwise direction. Rotary valve 36 is of circular cross section and has a slidable fit with arcuate notches within exhaust channel 35, valve 36 having a diametrical slot 38 to allow the gaseous combustion exhaust products to travel therethrough during those time periods when slot 38 lies substantially along the exhaust channel elongate axis, as indicated in FIG. 1.

The internal combustion engine of the present invention necessarily includes inlet means to supply a combustibly explodable gaseous fuel medium to the compression means so that successive batches of a finite given gravimetric quantity of the gaseous fuel might be compressibly delivered by the compression means into the explosion chamber. When the compression means comprises a reciprocatable piston as herein shown, the inlet means comprises an inlet port e.g., 24, through the cylinder, said inlet port 24 being positioned forwardly of the piston forward limit of travel and herein positioned in partition wall 13 laterally leftwardly of upright divider wall 25 and entrance port valve 26. There is an inlet port valve 27 disposed at inlet port 24 and adapted to alternately open and close the inlet port during the said given time interval, said inlet port valve 27 being open and beginning to close as piston 15 during its rearward stroke reaches its rearward limit of travel. Herein, inlet port valve 27 comprises a relatively narrow upright vertically reciprocatable shank or stem having a downwardly divergent head adapted to be upwardly closeably seated into upwardly divergent inlet port 24. Herein, there is an inlet channel 32 for the introduction of gaseous combustible fuel from a supply source (not shown) through inlet port 24 into cylinder 10 and ultimately into explosion chamber 30. Thus, fuel mixtures e.g., air and vaporized hydrocarbon, are subjected to an unusually high desireable homogeneity in three separate stepwise chambers 32, 10 and 30.

The entrance port valve 26 is disposed at entrance port 23 and adapted to alternately open and close the entrance port during the said given time interval, said entrance port valve being open and beginning to close as piston 15 during its forward stroke reaches its forward limit of travel. Herein, entrance port valve 26, analogous to inlet port valve 27, comprises a relatively narrow upright vertically reciprocatable shank or stem having a upwardly divergent head adapted to be downwardly closeably seated into downwardly convergent entrance port 23.

As has already been alluded to, the internal combustion engine of the present invention is based upon the batchwise introduction of compressed gaseous fuel into explosion chamber 30 followed by the intermittent pulsewise exhaust of the gaseous combustion products through exhaust channel 35. Accordingly, the inlet port valve e.g., 27, the entrance port valve e.g., 24, the exhaust valve e.g., 36, and the ignition means if it be as a periodically activated spark plug 28, must each have a timed actuation relationship with the compression means e.g., reciprocatably piston 15. Such timed actuation relationship among valves, and a spark plug ignition means in accordance with the positions of the compression means e.g., reciprocatable piston 15, is, of course, well known in the prior art. Such prior art timing techniques may be analagously employed with the novel internal combustion engine of the present invention such that the following sequence of events results with each revolution of crankshaft 17 during a given time interval. FIGS. 1–4 represent four different stages or positions of the reciprocatable piston 15 compression means of a two-stroke cycle engine along axis 11 during a complete revolution of crankshaft 17 and one batchwise explosion and intermittent pulsewise exhaust along exhaust channel 35; crankshaft 17, valves 26–27 and 36, and spark plug 28 have motive power (now shown) wholly external to gases exploded in chamber 30.

In FIG. 1 wherein piston 15 is about halfway along its rearward stroke (toward cylinder rearward end 14): inlet port valve 27 is open to admit gaseous fuel from inlet chamber 32 through inlet port 24 into cylinder 10 forwardly of piston 15; entrance port valve 26 is closed; and the exhaust valve 36 is temporarily open to allow the gaseous combustion products of the immediately preceding FIG. 4 explosion to surge along exhaust channel 35 to do work therealong e.g., turbine 40, or marine craft propulsion means 50.

In FIG. 2 wherein piston 15 has just attained its rearward limit of travel: entrance port valve 26 is in the closed position and beginning to open; inlet port valve 27 has just closed whereby a finite given gravimetric quantity or batch of the gaseous fuel is located within cylinder 10 between piston forward end 16 and fixed partition wall 13; and exhaust valve 36 is closed so that another finite quantity of gaseous combustion product is located within exhaust channel 35 well downstream of exhaust valve 36, there being a sharply reduced rate of gas movement along exhaust channel 35 compared to the FIG. 1 situation.

In FIG. 3 wherein the piston 15 compression means is about halfway along its forward stroke (toward partition wall 13): inlet port valve 27 is in the closed position; exhaust valve 36 is in the closed position; and entrance port valve 26 is in the open position whereby a portion of the gaseous fuel batch has been pushed forwardly through the partition wall entrance port 23 by forwardly moving compressor means 15.

In FIG. 4 wherein the piston 15 has just attained its forward limit of travel: inlet port valve 27 is in the closed position and beginning to open; entrance port valve 26 has just closed whereby substantially the entire fuel batch is within explosion chamber 30; the spark plug 28 is briefly actuated to ignite the fuel batch; and exhaust valve 36 is just beginning to open to allow the gaseous combustion product exhaust to briefly surge or pulse into exhaust channel 35.

Figure 5:
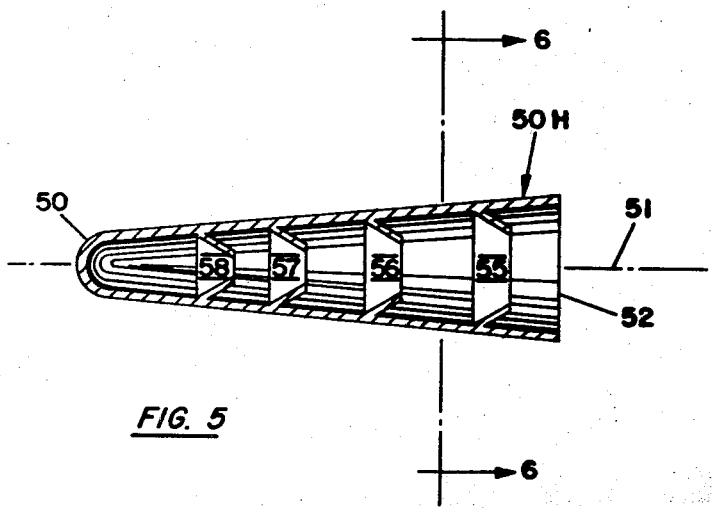
FIG. 5 is a schematic axial cross-sectional view of an alternate type exhaust channel for the external combustion engine of FIGS. 1–4.
Figure 6:
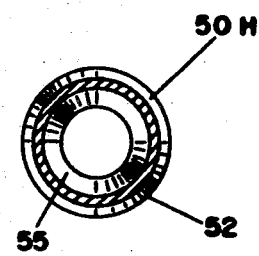
FIG. 6 is a transverse cross-sectional view taken along line 6—6 of FIG. 5.

FIGS. 5 and 6 disclose an alternate type adaption of exhaust channel 35 wherein the intermittent pulsewise exhaust of the gaseous combustion products from explosion chamber 30 are usefully employed within marine craft propulsion means 50, as with boat "B" of FIG. 7. The internal combustion engine e.g., "E" of the present invention is utilized to motivate a marine craft e.g., "B," across the water body. Engine "E" is herein mounted within boat "B" upon boat floor "F" and located near the stern panel "S" thereof. Engine "E" in the FIGS. 5–7 embodiment is in all respects identical to the embodiment heretofore described relative to FIGS. 1–4 and differs only in respect to those portions of exhaust channel 35 located downstream of exhaust valve 36. In general, marine craft propulsion means 50, extending between swivel joint 39 and a flared terminal end 52, is substituted for turbine wheel 40.

Marine craft propulsion means 50 is of generally tubular shape and comprises three main sections including an upper horizontal initial section 50A, an upright intermediate section, and a lower horizontal divergent terminal section 50H. Initial tubular section 50A is pivotably attached to the exhaust channel portion 35 with swivel joint 39 located approximately at location 41 of FIG. 1. Initial section 50A carries a handle "H" to effect manual pivotal movement in terminal section 50H about the elongate upright axis of the intermediate tubular section.

The elongate horizontal axis 51 of the divergent terminal section 50H is disposed below the waterline "WL" and preferably at or below the boat floor "F." As has already been alluded to, terminal section 50H is linearly divergent toward the rearward terminus 52 thereof. Terminal section 50H is internally integrally provided with a plurality of annular fins 55–58, each fin surrounding axis 51 and extending obliquely rearwardly from the internal wall toward terminus 52. The rearward circular opening and the length along axis 51 of each fin is substantially identical. However, the interfin spacing progressively regularly increases forwardly of terminal end 52, and hence for example, neighboring fins 58 and 57 are located closer together than are neighboring fins 55 and 56. Thus, the internal volume of terminal section 50H between neighboring fins decreases progressively forwardly of terminal end 52. In the case of multicylinder engines "E," the several exhaust channels 35 would merge into a single divergent terminal member 50H.

Operation of the marine craft propulsion means 50 is as follows: At each given time interval a pulse of gaseous combustion product emerges from explosion chamber 30 into exhaust channel 35 by virtue of exhaust valve 36. Each pulse of exhaust gas expands and travels pulsewise along initial section 50A and ultimately reaches terminal section 50H wherein annular fins 55–58 tend to momentarily restrict progressively larger quantities of exhaust gas between neighboring fins. Finally, by virtue of successive exhaust pulses through the exhaust valve, a relatively massive volume of exhaust gas between rearward fin 55 and terminus 52 surges horizontally into the surrrounding water causing the marine craft "B" to move forwardly. The boat direction can be manually controlled by means of handle "H"0 and swivel connection 39.

Having now generally described the internal combustion engine of the present invention, including a specific type compression means therefore, it is desired to claim the invention as follows.

I claim:

1. An internal combustion engine comprising:
   A. An explosion chamber adapted to thermally combustibly explode successive finite batches of a compressed gaseous thermally combustibly explodable medium, each successive batch explosion being spaced at a given time interval, said explosion chamber including a partition wall providing a portion of the fixed volumetric confines thereof, said partition wall having an entrance port therethrough for the introduction of each successive finite given gravimetric quantity of a compressed gaseous combustibly explodable medium into the explosion chamber, and an entrance port valve disposed at the entrance port and adapted to alternately open and close the entrance port during the said given time interval, said entrance port valve being closed during the explosion of the finite volume of compressed gaseous medium within the explosion chamber;
   B. A compression means disposed wholly externally to the explosion chamber and adapted to intermittently deliver a finite given gravimetric quantity batch of a compressed gaseous thermally combustibly explodable medium into the explosion chamber through the entrance port when the entrance port valve is in the open position; and
   C. An exhaust channel communicating with the explosion chamber remote of the partition wall thereof and extending downstream from the explosion chamber to terminate as an exhaust channel open rearward end, an exhaust valve disposed along the exhaust channel nearer to the explosion chamber than to the exhaust channel open rearward terminal end and being adapted to alternately open and close during said given time interval, the exhaust channel rearward terminal portion progressively regularly diverging toward the rearward open end thereof whereby the internal bore of the exhaust channel regularly progressively increases in cross-sectional size toward the exhaust channel open rearward end; and wherein the exhaust channel includes a plurality of annular fins attached to the exhaust channel interior wall and extending obliquely downstream with respect to the exhaust channel interior wall.

2. The internal combustion engine of claim 1 mounted in combination with a horizontally floored marine craft to provide motive power for said marine craft, the internal combustion engine exhaust channel rearward terminal portion being substantially horizontal and being positioned astern said marine craft below the floor level thereof, and the said annular fins for the exhaust channel rearward terminal portion being spaced at progressively greater increments toward the exhaust channel open rearward terminal end.